US012649479B2

(12) United States Patent
Oh

(10) Patent No.: US 12,649,479 B2
(45) Date of Patent: Jun. 9, 2026

(54) METHOD AND APPARATUS FOR CONTROLLING AUTOMATIC DRIVING

(71) Applicants:Hyundai Motor Company, Seoul (KR); Kia Corporation, Seoul (KR)

(72) Inventor: Tae Dong Oh, Seoul (KR)

(73) Assignees: 1. Hyundai Motor Company;, Seoul (KR); 2. Kia Corporation, Seoul (KR)

( * ) Notice: Subject to any disclaimer, the term of this patent is extended or adjusted under 35 U.S.C. 154(b) by 165 days.

(21) Appl. No.: 18/828,872

(22) Filed: Sep. 9, 2024

(65) Prior Publication Data

US 2025/0282367 A1     Sep. 11, 2025

(30) Foreign Application Priority Data

Mar. 5, 2024     (KR) ........................ 10-2024-0031500

(51) Int. Cl.
*B60W 50/06*        (2006.01)
*B60W 60/00*        (2020.01)

(52) U.S. Cl.
CPC .......... *B60W 50/06* (2013.01); *B60W 60/001* (2020.02)

(58) Field of Classification Search
CPC .... B60W 50/06; B60W 60/001; B60W 50/16; B60W 60/00; B60W 2050/0019; G06N 5/04
See application file for complete search history.

(56)                   References Cited

U.S. PATENT DOCUMENTS

2016/0070535 A1*   3/2016  Karr .......................... G06F 5/14
                                                  711/110
2017/0070363 A1*   3/2017  Watkins ................ H04L 12/423
2023/0339499 A1*  10/2023  Binet .................. G06F 12/0815
2024/0177027 A1*   5/2024  Ezrielev ................ G06N 5/043

* cited by examiner

*Primary Examiner* — Christopher George Fees
(74) *Attorney, Agent, or Firm* — MORGAN, LEWIS & BOCKIUS LLP

(57)                   ABSTRACT
In a method and an apparatus for controlling autonomous driving of an autonomous vehicle, the method may include obtaining pieces of processing target data for a specific task of an autonomous vehicle, identifying drop data excluding specific processing target data, which is input to at least one specific inference model corresponding to the specific task, from among the pieces of processing target data, generating a drop score for the drop data based on information corresponding to the drop data, determining whether to increase a number of the specific inference model based on the drop score, and controlling autonomous driving of the autonomous vehicle by adjusting the number of the specific inference model based on the determining.

17 Claims, 8 Drawing Sheets

SEQUENTIALLY OBTAIN PIECES
OF PROCESSING TARGET DATA ~S110

IDENTIFY DROP DATA EXCLUDING
SPECIFIC PROCESSING TARGET DATA ~S120

GENERATE DROP SCORE BASED ON
INFORMATION CORRESPONDING TO DROP DATA ~S130

DETERMINE WHETHER TO INCREASE
NUMBER OF SPECIFIC INFERENCE MODELS ~S140

SUPPORT AUTONOMOUS DRIVING
OF AUTONOMOUS VEHICLE ~S150

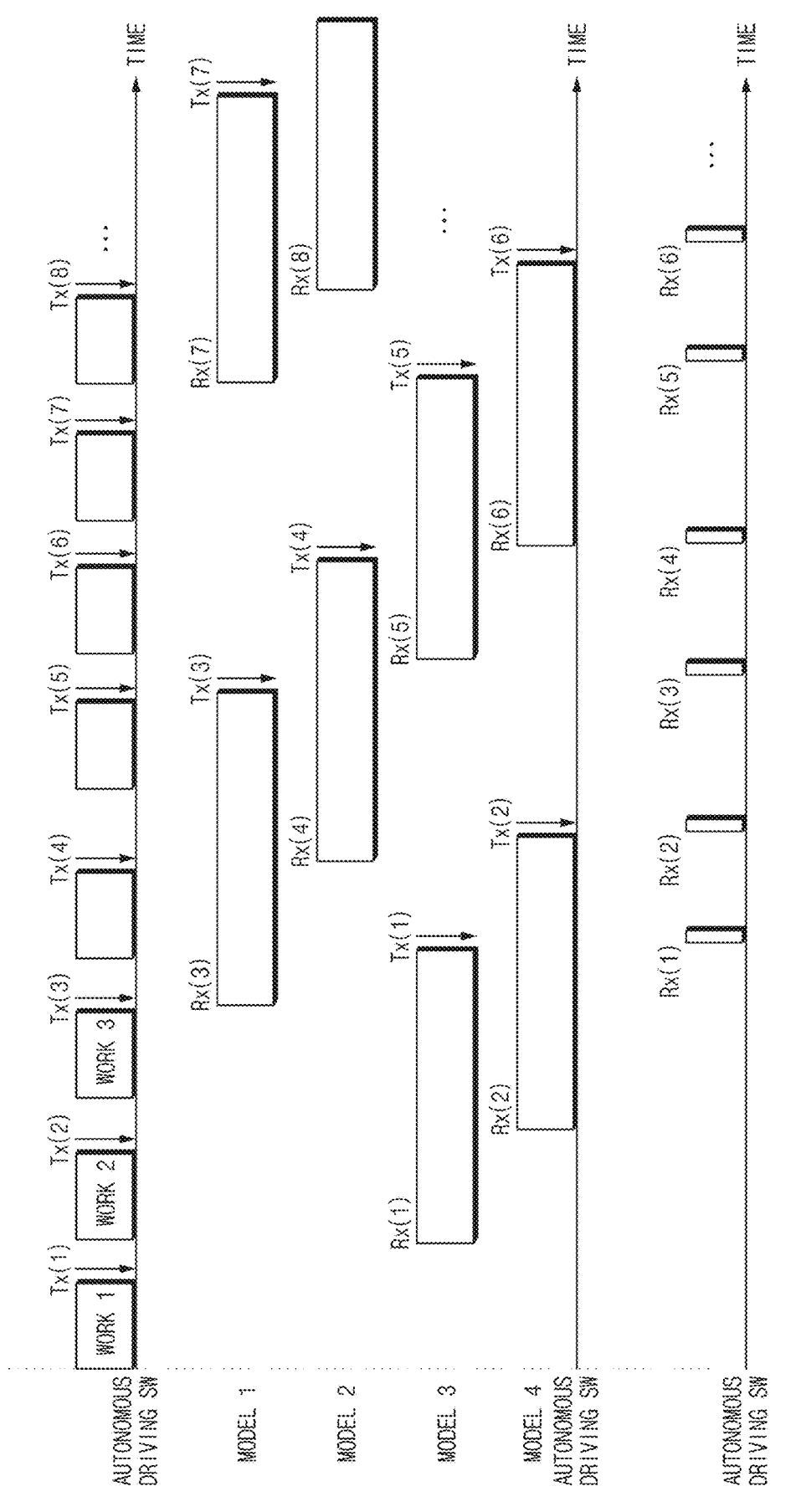
F I G. 3B

APPARATUS
100

PROCESSOR
110

MEMORY
120

INSTRUCTIONS
122

METHOD AND APPARATUS FOR CONTROLLING AUTOMATIC DRIVING

CROSS-REFERENCE TO RELATED APPLICATION

The present application claims priority to Korean Patent Application No. 10-2024-0031500, filed on Mar. 5, 2024, the entire contents of which is incorporated herein for all purposes by this reference.

BACKGROUND OF THE PRESENT DISCLOSURE

Field of the Present Disclosure

The present disclosure relates to a method and an apparatus for controlling autonomous driving of an autonomous vehicle.

Description of Related Art

For an autonomous vehicle to perform autonomous driving, an autonomous driving module needs to perform a process of delivering pieces of input data corresponding to the corresponding specific task to a satellite module (an inference module or a deep learning module) that processes the specific task, and reconstructing pieces of inference result data for use in driving determination and vehicle control if the pieces of inference result data for the pieces of input data are obtained from the satellite module.

However, in common, the determination period of the autonomous driving module may be different from the determination period of the inference module. If the determination period of the inference module is longer than the determination period of the autonomous driving module, errors may occur in inference results as a bottleneck occurs due to the processing time delay of the inference module. If the determination period of the autonomous driving module is longer than the determination period of the inference module, information updated by the inference module may not be utilized in the autonomous driving module and may be discarded.

Accordingly, a method is being researched to effectively schedule the inference module so that an autonomous vehicle is configured to perform smooth autonomous driving.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method and an apparatus for controlling autonomous driving of an autonomous vehicle.

Various aspects of the present disclosure are directed to providing a method and an apparatus for flexibly adjusting the number of inference models with reference to information related to processing target data dropped from a buffer.

Various aspects of the present disclosure are directed to providing a method and an apparatus for utilizing a deep learning module with a long computation time even in an autonomous driving system that requires repeated determination at a short period.

Various aspects of the present disclosure are directed to providing a method and an apparatus for rapidly responding to rapidly changing driving situations.

Various aspects of the present disclosure are directed to providing a method and an apparatus for efficiently using resources of an autonomous driving system.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a method for controlling autonomous driving of an autonomous vehicle may include obtaining pieces of processing target data for a specific task of an autonomous vehicle, identifying drop data excluding specific processing target data, which is input to at least one specific inference model corresponding to the specific task, from among the pieces of processing target data, generating a drop score for the drop data based on information corresponding to the drop data, determining whether to increase a number of the specific inference model based on the drop score, and controlling autonomous driving of the autonomous vehicle by adjusting the number of the specific inference model based on the determining.

In an exemplary embodiment of the present disclosure, the generating of the drop score may include generating the drop score for the drop data based on at least some of reliability information and drop elapsed time information, which correspond to the drop data.

In an exemplary embodiment of the present disclosure, as the reliability information may include a great value, the drop score includes a great value, and as the drop elapsed time information includes a small value, the drop score may include a great value.

In an exemplary embodiment of the present disclosure, after the obtaining of the pieces of processing target data, the method may further include assigning at least some of the specific processing target data to an idle specific inference model among the specific inference model, relocating specific inference data if the specific inference data, which is an inference result of the specific inference model for the specific processing target data, is generated, and determining whether to remove some of the specific inference data based on information corresponding to the specific inference data and information corresponding to a second buffer.

In an exemplary embodiment of the present disclosure, the information corresponding to the specific inference data may be generated based on at least some of object number information within a reference radius, reliability information, and time stamp information, which are included in the specific inference data.

In an exemplary embodiment of the present disclosure, the determining of whether to increase the number of the specific inference model may include determining whether to increase the specific inference model based on a result of comparing a predetermined threshold score corresponding to the specific inference model with the drop score, and available resource information.

In an exemplary embodiment of the present disclosure, after the determining of whether to increase the number of the specific inference model, the method may further include determining whether to remove some of at least two specific inference models based on an idle time of each of the at least two specific inference models if the specific inference model includes the at least two specific inference models.

In an exemplary embodiment of the present disclosure, before the identifying of the drop data, the method may further include sequentially storing the pieces of processing target data in a first buffer, and removing the drop data among the pieces of processing target data from the first buffer.

According to an aspect of the present disclosure, an apparatus for controlling autonomous driving of an autonomous vehicle may include a memory that stores computer-executable instructions, and at least one processor that executes the instructions by accessing the memory. The at least one processor may obtain pieces of processing target data for a specific task of an autonomous vehicle, may identify drop data excluding specific processing target data, which is input to at least one specific inference model corresponding to the specific task, from among the pieces of processing target data, may be configured to generate a drop score for the drop data based on information corresponding to the drop data, may be configured to determine whether to increase a number of the specific inference model based on the drop score, and may be configured for controlling autonomous driving of the autonomous vehicle by adjusting the number of the specific inference model based on the determining.

In an exemplary embodiment of the present disclosure, the at least one processor is configured to generate the drop score for the drop data based on at least some of reliability information and drop elapsed time information, which correspond to the drop data.

In an exemplary embodiment of the present disclosure, as the reliability information may include a great value, the drop score includes a great value, and as the drop elapsed time information includes a small value, the drop score may include a great value.

In an exemplary embodiment of the present disclosure, the at least one processor may assign at least some of the specific processing target data to an idle specific inference model among the specific inference model, may relocate specific inference data if the specific inference data, which is an inference result of the specific inference model for the specific processing target data, is generated, and may be configured to determine whether to remove some of the specific inference data based on information corresponding to the specific inference data and information corresponding to a second buffer.

In an exemplary embodiment of the present disclosure, the information corresponding to the specific inference data may be generated based on at least some of object number information within a reference radius, reliability information, and time stamp information, which are included in the specific inference data.

In an exemplary embodiment of the present disclosure, the at least one processor is configured to determine whether to increase the specific inference model based on a result of comparing a predetermined threshold score corresponding to the specific inference model with the drop score, and available resource information.

In an exemplary embodiment of the present disclosure, the at least one processor is configured to determine whether to remove some of at least two specific inference models based on an idle time of each of the at least two specific inference models if the specific inference model includes the at least two specific inference models.

In an exemplary embodiment of the present disclosure, the at least one processor may sequentially store the pieces of processing target data in a first buffer, and may remove the drop data, which is some of the pieces of processing target data, from the first buffer.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 3A and FIG. 3B are diagrams for comparing an operation result of an autonomous driving system according to the related art with an operation result of an autonomous driving system according to an exemplary embodiment of the present disclosure;

Figure 1:
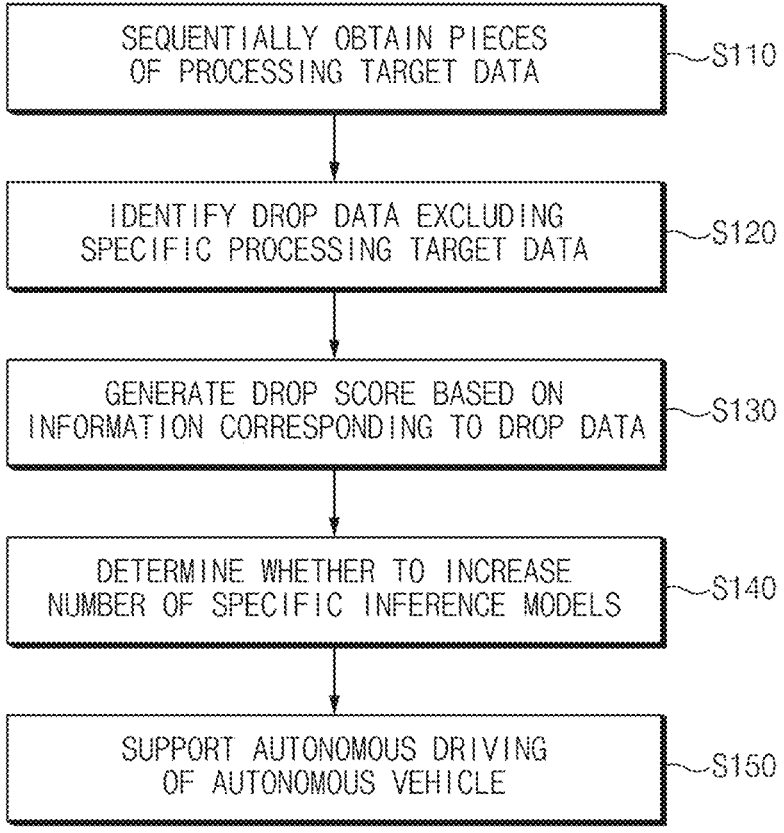
FIG. 1 is a flowchart illustrating a method for controlling autonomous driving of an autonomous vehicle, according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

With regard to description of drawings, the same or similar components will be marked by the same or similar reference signs.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings. In adding reference numerals to components of each drawing, it should be noted that the same components include the same reference numerals, although they are indicated on another drawing. In describing embodiments of the present disclosure, detailed descriptions associated with well-known functions or configurations will be omitted if they may make subject matters of the present disclosure unnecessarily obscure. Various embodiments of the present disclosure may be described with reference to accompanying drawings. Accordingly, those of ordinary skill in the art will recognize that modification, equivalent, and/or alternative on the various embodiments described herein may be variously made without departing from the scope and spirit of the present disclosure. With regard to the description of drawings, similar components may be marked by similar reference marks/numerals.

In describing components of embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as including a meaning which is consistent with their meaning in the context of the present disclosure and the relevant art and will not be interpreted in an idealized or overly formal sense unless so defined herein. For example, the terms, such as "first", "second", and the like used herein may refer to various components of various embodiments of the present disclosure, but do not limit the elements. For example, "a first user device" and "a second user device" may indicate different user devices regardless of the order or priority thereof. For example, without departing the scope of the present disclosure, a first complement may be referred to as a second component, and similarly, a second complement may be referred to as a first complement.

In the present specification, the expressions "possess", "may possess", "include" and "comprise", or "may include" and "may comprise" used herein indicate existence of corresponding features (e.g., elements such as numeric values, functions, operations, or components) but do not exclude presence of additional features.

It will be understood that if an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, if an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of".

The term "configured to" may not mean only "specifically designed to" in hardware. Instead, the expression "a device configured to" may mean that the device is "capable of"

operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which is configured to perform corresponding operations by executing one or more software programs which are stored in a memory device. Terms used in an exemplary embodiment of the present disclosure are used to describe specified embodiments and are not intended to limit the scope of the present disclosure. The terms of a singular form may include plural forms unless otherwise specified. All the terms used herein, which include technical or scientific terms, may include the same meaning which is generally understood by a person skilled in the art. It will be further understood that terms, which are defined in a dictionary and commonly used, should also be interpreted as is customary in the relevant related art and not in an idealized or overly formal sense unless expressly so defined herein in various embodiments of the present disclosure. In some cases, even if terms are terms which are defined in the specification, they may not be interpreted to exclude embodiments of the present disclosure.

In an exemplary embodiment of the present disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included. Moreover, in describing a component of an exemplary embodiment of the present disclosure, the expressions at least one of "A or B", "at least one of A and B", "at least one of A or B", "A, B, or C", "at least one of A, B, and C", or "at least one of A, B, or C", or any combination thereof may include any and all combinations of one or more of the associated listed items. Expressions "at least one of A, B, or C, or any combination thereof" may include A, B, or C, or any combination thereof such as AB, ABC, or the like. Hereinafter, various exemplary embodiments of the present disclosure will be described in detail with reference to FIGS. 1 to 6.

FIG. 1 is a flowchart illustrating a method for controlling autonomous driving of an autonomous vehicle, according to an exemplary embodiment of the present disclosure.

First of all, pieces of processing target data for a specific task of an autonomous vehicle may be sequentially obtained (S110).

For example, the processing target data may be the result of fusing pieces of object information around a host vehicle that are detected through sensors of a vehicle provided with an autonomous driving system.

For example, the processing target data may be information necessary for a specific inference model to perform a specific task. For example, the processing target data may be an inference data set, which is a set of features input to the specific inference model.

For example, first processing target data corresponding to a first task may be information necessary for a first inference model to perform the first task (e.g., a driving route generation task for an autonomous vehicle). Second processing target data corresponding to a second task may be information necessary for a second inference model to perform the second task (e.g., a lane change task for an autonomous vehicle).

In the meantime, a resource may be divided into a computational resource and a memory. In the instant case, the computational resource may be a computational resource (CPU, GPU, or the like) used for processing operations of the process. Moreover, the memory may be a space (RAM, VRAM, or the like) for storing variables (local, global, static, or the like) and a code segment, which are required for a process operation. If the autonomous driving situation becomes rapidly complicated, the amount of computation and memory required for autonomous driving may change rapidly, and thus it may be desirable to allocate resources with a margin.

Accordingly, adaptively increasing or decreasing the number of specific inference models may be an efficient method of using resources of an autonomous driving system rather than constructing task-specific inference models in parallel by use of all available resources.

For reference, in a case of the computational resource, available resources may be determined based on whether there are extra resources with the utilization rate or higher of a computational device occupied in the current driving situation. Furthermore, in the case of the memory, available resources may be determined based on whether there are extra memories with the memory occupancy rate or higher in the current driving situation.

For reference, for convenience, it is described that a specific type of an inference model performs a specific task, but embodiments are not limited thereto. For example, the method according to an exemplary embodiment included in the present specification may also be applied to two or more tasks.

For example, if the processing target data is obtained sequentially, the apparatus may sequentially store the processing target data in a first buffer.

Besides, some of the processing target data stored in the first buffer may be removed (dropped) for various reasons.

For example, while the specific inference model processes input data (e.g., input data corresponding to time point (t−2)) corresponding to a specific task, after being stored in the first buffer as new input data (e.g., input data corresponding to time point (t−1)) corresponding to the specific task is obtained, existing buffer data (i.e., input data corresponding to time point (t−1)) may be dropped from the first buffer if new input data (e.g., input data corresponding to time point (t)) corresponding to the specific task is obtained in the first buffer. Alternatively, some data (e.g., input data corresponding to time point (t−1)), of which the storage time exceeds a predetermined storage time, from among the processing target data stored in the first buffer may be dropped.

For reference, the predetermined storage time may include the same value regardless of tasks, but embodiments are not limited thereto. For example, different storage times may be set for at least some of the tasks.

As the driving situation is changed as such, the amount of data capable of being processed by the pre-generated inference model is exceeded. Accordingly, if the processing target data is obtained, drop data incapable of being processed by the pre-generated inference model occurs. In the instant case, inference results are generated based on only some processing target data out of the total processing target data. The autonomous driving module is configured to perform driving and determination control of a vehicle based only on some inference results, and thus the reliability of the determination of the autonomous driving module may decrease.

To overcome this, if the drop data corresponding to a specific task occurs, it is possible to actively respond to changes in driving situations by increasing the number of specific inference models corresponding to a specific task. In other words, the autonomous driving module may obtain the inference results of specific inference models in a shorter time interval than the inference period of each specific inference model, and thus the autonomous driving module may perform precise vehicle driving and determination control.

In the instant case, a drop score and/or available resources may be used based on a condition for increasing the number of specific inference models.

If a drop score condition and an available resource condition are satisfied, the logic of parallelizing (multiplexing) the specific inference model may be performed by dynamically allocating the same model as the specific inference model. Hereinafter, specific examples will be described.

For example, if the processing target data is obtained in S110, the apparatus may identify drop data excluding the specific processing target data among the processing target data (S120).

In the instant case, the specific processing target data may be data input to at least one specific inference model corresponding to the specific task among the processing target data.

Moreover, if the drop data is identified in S120, the apparatus may be configured to generate a drop score for the drop data with reference to information corresponding to the drop data (S130).

For example, the information corresponding to the drop data may include importance information of the drop data and elapsed time information from a drop time point.

In the instant case, the importance information of the drop data may be determined based on the object recognition reliability of objects included in the drop data. For example, the importance information of the drop data may be the average value of reliability object recognition of objects included in the drop data.

In the instant case, as the reliability information includes a great value, the drop score may include a great value. As the drop elapsed time information includes a small value, the drop score may include a great value.

For example, first processing target data (work 1) to fourth processing target data (work 4) for the specific task may be sequentially obtained. While the specific inference model is performing inference on the first processing target data (work 1), obtained second processing target data (work 2) and obtained third processing target data (work 3) may be dropped. In the case, the drop scores of second processing target data (work 2) and third processing target data (work 3) may be generated as shown in Table 1 below.

For reference, a drop score generation method according to Table 1 below is provided as an example for illustration purposes, and a method included in the present specification is not limited thereto.

TABLE 1

| | Second processing target data (work 2) | Third processing target data (work 3) |
|---|---|---|
| Object recognition reliability | $c_1$ (average object recognition reliability of inference target objects in work 2) | $c_2$ (average object recognition reliability of inference target objects in work 3) |
| Drop time point | Before $T_1$ second | Before $T_2$ second |
| Drop score | $(c_1 * w_1) + (w_2/T_1)$ | $(c_2 * w_1) + (w_2/T_2)$ |

For reference, $w_1$ denotes a weight applied to object recognition reliability, and $w_2$ denotes a weight applied to a drop time point (drop elapsed time).

For reference, average object recognition reliability $c_k$ may be determined according to Equation 1 below.

$$C_k = \frac{1}{N_k} \sum_{i=1}^{N_k} C_{k,i} \qquad \text{[Equation 1]}$$

For reference, $N_k$ may be the number of surrounding objects in work k. $c_{k,i}$ may be the reliability of the i-th object in work k.

In the instant case, as the average object recognition reliability is great, the weight $w_1$ applied thereto may include a great value. For example, in Table 1, if $c_1$ is greater than $c_2$, a value of weight $w_1$ applied to $c_1$ may be greater than a value of weight $w_1$ applied to $c_2$.

Alternatively, regardless of the level of average object recognition reliability, the weight $w_1$ applied to each work may include the same value.

Moreover, as shown in Table 1, as the dropped time point is older, it may be less relevant to the current overload state of a determination device (inference model), and thus higher weight may be assigned to recently dropped work.

Furthermore, if a drop score is generated in S130, the apparatus may be configured to determine whether to increase the number of specific inference models with reference to the drop score (S140).

For example, the apparatus may be configured to determine whether to increase the specific inference model with reference to the result of comparing a predetermined threshold score corresponding to the specific inference model with the drop score, and available resource information.

For reference, the predetermined threshold score may include the same value regardless of tasks, but embodiments are not limited thereto. For example, different threshold score may be set for at least some of the tasks.

For example, if available resources are secured to increase the number of specific inference models so that the number of specific inference models is greater than or equal to 'I', and the drop score for each of 'i' pieces of drop data is greater than or equal to a predetermined threshold score, the apparatus may increase the number of specific inference models corresponding to a specific task by 'i', relieving the burden of the specific inference model, and checking the inference results at various times by minimizing dropped data.

Besides, the apparatus may be configured for controlling autonomous driving of an autonomous vehicle by adjusting (increasing or maintaining) the number of specific inference models based on the determination according to S140.

For example, (i) if there is too much data being dropped, the apparatus may increase the number of specific inference models. Alternatively, (ii) if there is no or relatively little data dropped, the apparatus may maintain the number of specific inference models. In the present way, the apparatus may be configured for controlling the autonomous driving based on inference results at a time zone in which there are a lot of autonomous vehicles.

Figure 2A:
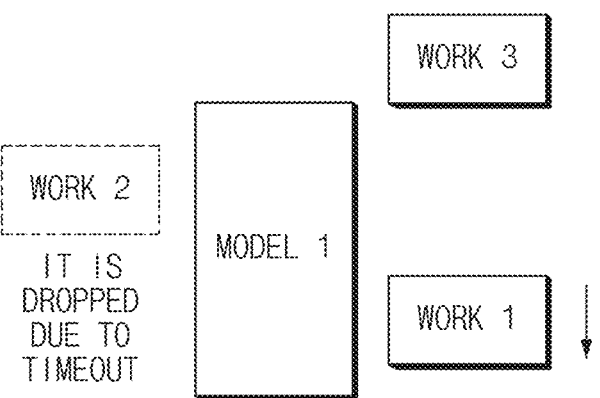
FIG. 2A and FIG. 2B are diagrams for comparing an operation result of an autonomous driving system according to the related art with an operation result of an autonomous driving system according to an exemplary embodiment of the present disclosure.
Figure 2B:
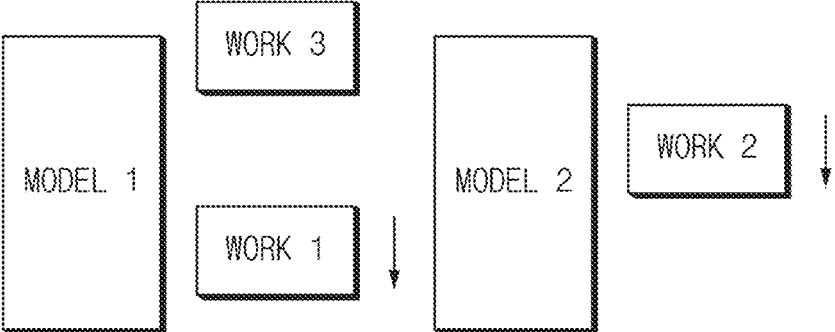

FIG. 2A and FIG. 2B are diagrams for comparing an operation result of an autonomous driving system according to the related art with an operation result of an autonomous driving system according to an exemplary embodiment of the present disclosure.

First of all, referring to FIG. 2A illustrating an operation result according to the related art, if work 2 (second processing target data for the specific task) is obtained while model 1 (i.e., a specific inference model that processes a specific task) is performing inference on work 1 (first processing target data for the specific task), work 2 may be stored in a first buffer.

Also, if (i) inference on work 1 does not end until work 3 is obtained, (ii) work 3 is obtained before the next determination period of the specific inference model arrives after the inference result for work 1 is generated, or (iii) the predetermined storage time is exceeded, work 2, which is the past data of work 3, may be dropped.

On the other hand, referring to FIG. 2B illustrating an operation results of an autonomous driving system according to an exemplary embodiment of the present disclosure, even if work 2 is obtained while model 1 (a specific inference model corresponding to the specific task) is performing inference on work 1 (first processing target data), inference on work 2 may be performed by model 2. Accordingly, the autonomous driving module may obtain inference results in the time period in which there are a lot of autonomous vehicles, performing more precise driving and determination control.

For reference, for convenience, FIG. 2A and FIG. 3A, which will be described later, illustrate only one inference model to describe the operation result of the related art. However, even if two or more inference models are generated, the same/similar descriptions may be applied. In other words, according to the related art, if the corresponding inference models are overloaded in a state where a plurality of inference models are generated, drop data may occur. Even if the drop data occurs accordingly, the number of relevant inference models may still be fixed, and thus it is difficult to respond to the occurrence of drop data.

Figure 3A:
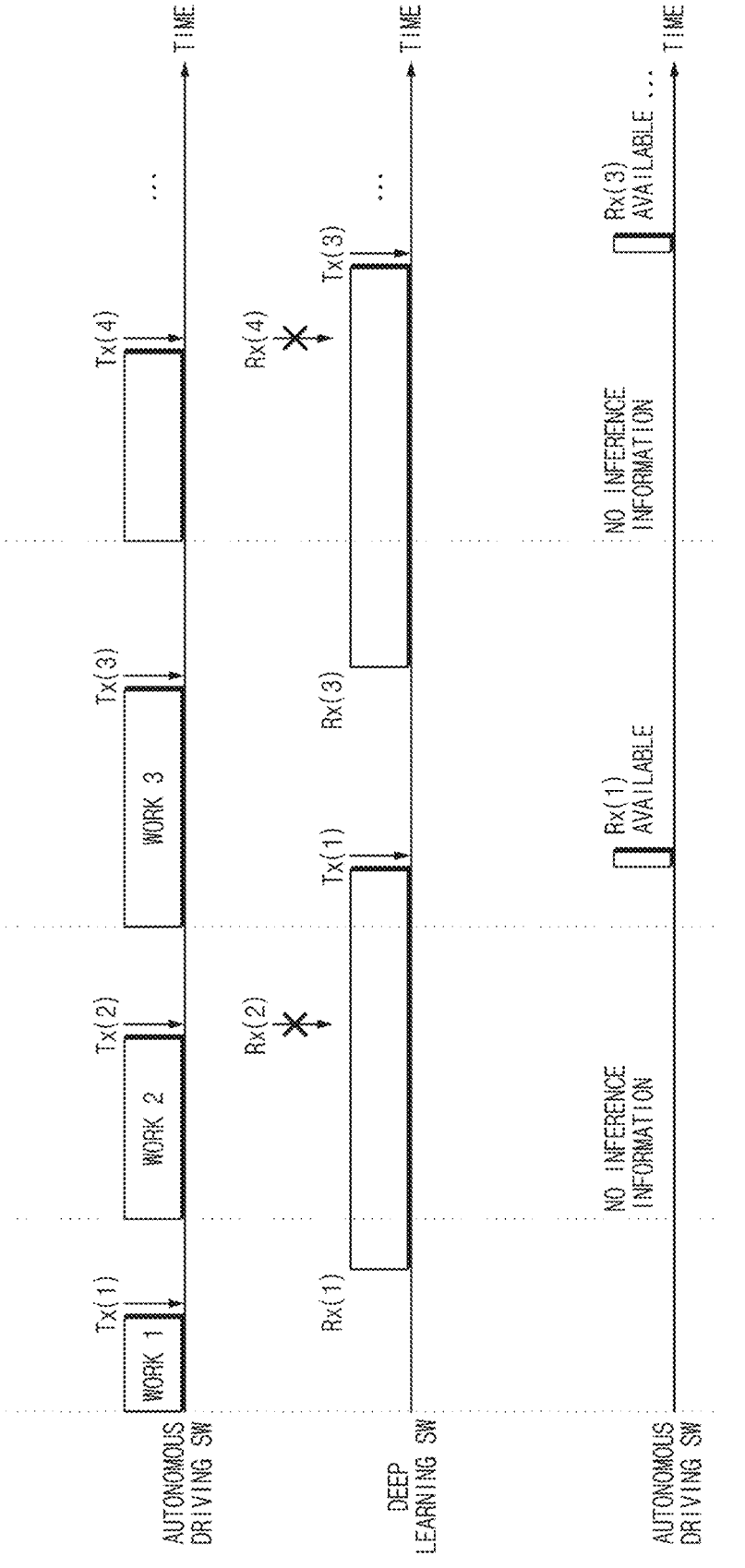

FIG. 3A and FIG. 3B are diagrams for comparing in more detail an operation result of an autonomous driving system according to the related art with an operation result of an autonomous driving system according to an exemplary embodiment of the present disclosure.

First of all, referring to FIG. 3A illustrating an operation result according to the related art, while a specific inference model (deep learning SW) corresponding to a specific task is performing inference on work 1 (first processing target data) as work 1 is obtained from an autonomous driving module, work 2 (second processing target data) may not be processed immediately by deep learning SW if work 2 is newly generated, and thus work 2 may be stored in a first buffer. However, if work 3 is newly obtained before the next determination period of the specific inference model arrives after the inference result for work 1 is generated by the specific inference model, work 2, which is the past data of work 3, is dropped. Moreover, work 4 is also dropped like work 2.

On the other hand, referring to FIG. 3B showing an operation result of an autonomous driving system according to an exemplary embodiment of the present disclosure, even if eight pieces of processing target data corresponding to a specific task are sequentially obtained in a state where the number of specific inference models is sufficiently increased (e.g., 4) through model parallelization in dynamic response to changes in the driving situation, it may be identified that inference results for all the pieces of processing target data are generated.

In the meantime, to use system resources efficiently, if an idle specific inference model among two or more specific inference models satisfies a predetermined condition, the apparatus may remove at least some of the idle specific inference model.

For example, if there are at least two specific inference models, the apparatus may be configured to determine whether to remove some of the specific inference models with reference to an idle time of each of the specific inference models.

For example, if the idle time of a second specific inference model among first, second, and third specific inference models that process a specific task exceeds a threshold idle time, the apparatus may remove the second specific inference model. Specific processing target data obtained later may be inferred by the first and third specific inference models.

If the first and third specific inference models are overloaded due to changes in the driving situation and then drop data occurs, as mentioned above, the apparatus may be configured to determine whether to increase the number of specific inference models corresponding to the specific task with reference to the drop score.

In the meantime, if processing target data is obtained sequentially in a state where a plurality of specific inference models are generated, the apparatus may distribute processing target data to a plurality of specific inference models and may perform driving and determination control based on inference result obtained from the specific inference models.

For example, if the processing target data is obtained, the apparatus may store the processing target data in the first buffer. If there is an idle specific inference model among the specific inference models, the apparatus may load at least some of the specific processing target data from the first buffer and may assign it to the idle specific inference model.

Moreover, if pieces of specific inference data, which are the inference results of the specific inference model for pieces of specific processing target data, are generated, the apparatus may relocate specific inference data through an autonomous driving module.

For example, the autonomous driving module may relocate specific inference data with reference to time stamp information of the specific inference data.

In the instant case, to prevent overflow of a second buffer in which specific inference data is stored, the apparatus may remove at least some of the specific inference data through the autonomous driving module.

For example, the apparatus may be configured to determine whether to remove some of the specific inference data through the autonomous driving module with reference to information corresponding to the specific inference data and information corresponding to the second buffer.

In the instant case, the information corresponding to the second buffer may be capacity information of the second buffer. Besides, the information corresponding to the specific inference data may be work importance information. For example, the work importance information may be determined based on at least some of object number information within a reference radius of specific processing target data, object recognition reliability information, and time stamp information.

For example, if first specific processing target data (work 1) and second specific processing target data (work 2) for a specific task are sequentially obtained, work importance information of the first specific processing target data (work 1) to the second specific processing target data (work 2) may be generated as shown in Table 2 below.

For reference, a work importance information generation method according to Table 2 below is provided as an example for illustration purposes, and a method included in the present specification is not limited thereto.

TABLE 2

|  | First specific processing target data (work 1) | Second specific processing target data (work 2) |
| --- | --- | --- |
| Number of objects within 10-meter radius | $n_{1,\,10}$ | $n_{2,\,10}$ |
| Number of objects within 30-meter radius | $n_{1,\,30}$ | $n_{2,\,30}$ |
| Object recognition reliability | $c_1$ (average object recognition reliability of inference target objects in work 1) | $c_2$ (average object recognition reliability of inference target objects in work 2) |
| Time stamp | Acquisition before $T_1$ seconds | Acquisition before $T_2$ seconds |
| Work importance information | $(n_{1,\,10}{}^{*}w_1) + (n_{1,\,30}{}^{*}w2) + (c_1{}^{*}w_3) + (w_4/T_1)$ | $(n_{2,\,10}{}^{*}w_1) + (n_{2,\,30}{}^{*}w2) + (c_2{}^{*}w_3) + (w_4/T_2)$ |

For reference, $w_1$ denotes a weight applied to the number of objects within a radius of 10 m; $w_2$ denotes a weight applied to the number of objects within a radius of 30 m; $w_3$ denotes a weight applied to object recognition reliability; and $w_4$ denotes a weight applied to the time stamp (acquisition time point).

For reference, the average object recognition reliability $c_k$ may be determined according to Equation 1 described above, and thus additional descriptions will be omitted to avoid redundancy.

The risk to the driving of a host vehicle may be proportional to the number of vehicles physically configured for colliding with the host vehicle, which may be inferred from the number of objects recognized as being present within a specific radius from the host vehicle. For reference, the present example shows the number of objects within the host vehicle's radius of 10 meters and 30 meters. However, the weight applied to the number of objects in radius of 5, 10, . . . , 200 meters may be reduced sequentially. Moreover, a confidence level, which is one of the sensor recognition performance indicators, may be used as the recognition reliability of each object. Furthermore, an example of a time stamp may be, but is not limited to, a time point (i.e., a time point immediately prior to input to the first buffer) at which preprocessing of sensor data for objects is completed.

In the meantime, as described above, driving route creation and lane change are described as examples of different tasks, but are not limited thereto.

For example, if multiple inference models are used, the same inference models share limited hardware resources with each other. It is possible to configure different sizes of inference models for efficient resource allocation. For example, inference may be performed through a small inference model with respect to tasks requiring small resources, and inference may be performed through a great inference model with respect to tasks requiring great resources.

In general, an inference model tends to consume more resources to infer correlations between objects as the number of objects increases. A smaller inference model may be used if the number of objects is small, and a larger inference model may be used if the number of objects is large to better account for correlations between objects.

In the instant case, two or more inference models may be flexibly configured. For example, if the number of objects in 3 consecutive frames is less than 100 as shown in Table 3 below, the same inference model as inference model 1 may be duplicated and used. If the number of objects in three consecutive frames is 100 to 200, the same inference model as inference model 2 may be duplicated and used. In the present way, resources may be effectively distributed to inference models in an autonomous driving system with limited resources.

TABLE 3

|  | Inference model 1 | Inference model 2 |
| --- | --- | --- |
| Number of input objects | 0 to 100 | 100 to 200 |
| Model type | Convolutional neural network (CNN) | Graph attention transformer (GAT) |
| Input data set | 2D bird's eye view time-series data around host vehicle (within radius of 100 m) | Precision map, object information, autonomous vehicle driving information time-series data |
| Number of model parameters | Less than 100,000 | 2 million or more |
| Time required for model inference | 50 ms | 150 ms |

Figure 4:
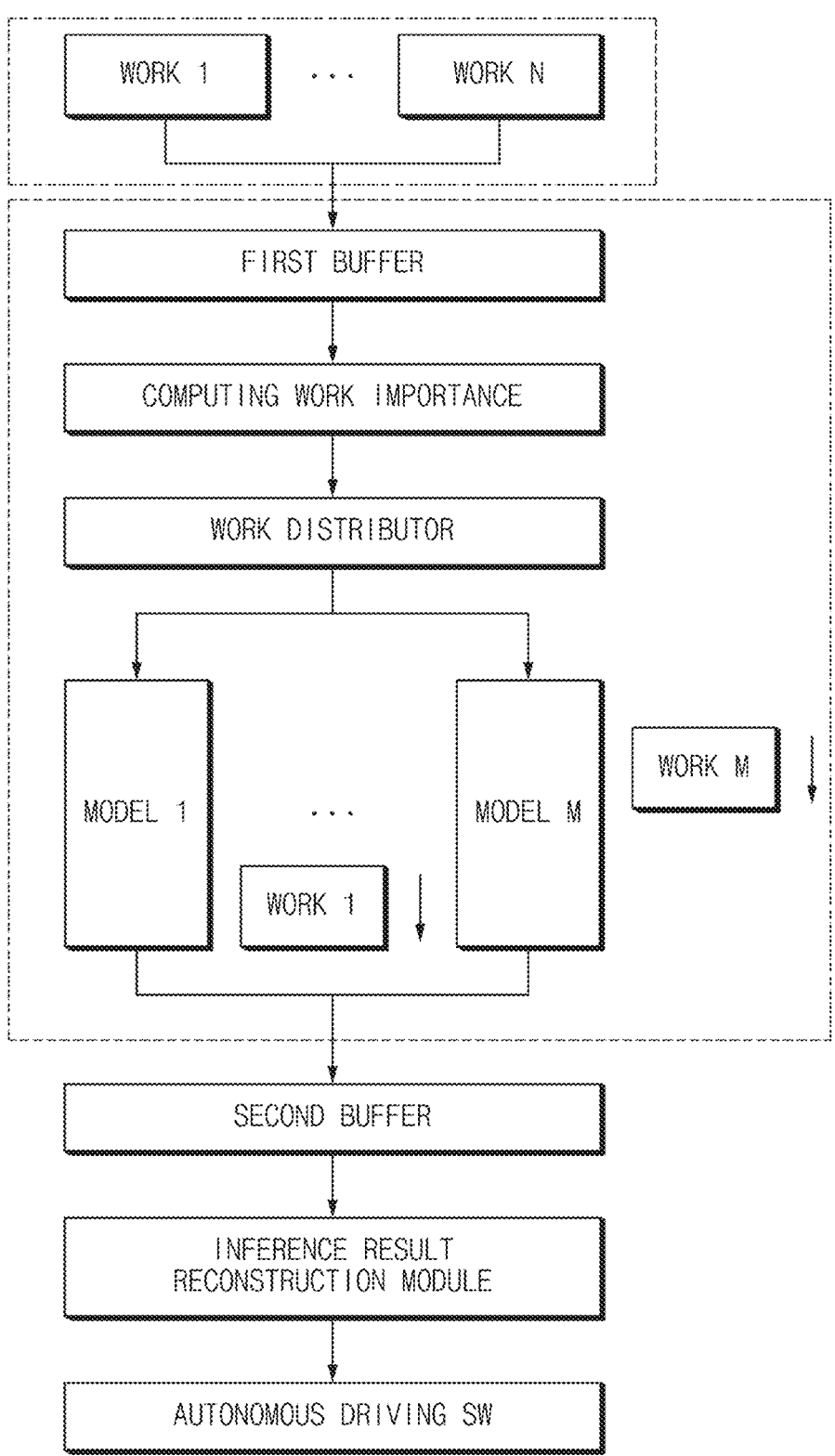
FIG. 4 is a diagram for describing a method for controlling autonomous driving of an autonomous vehicle, according to an exemplary embodiment of the present disclosure.

FIG. 4 is a diagram for describing an operation of an apparatus for efficient inference, according to an exemplary embodiment of the present disclosure.

Referring to FIG. 4, if pieces of processing target data (work 1 to work N) for a specific task are obtained, the apparatus may store pieces of processing target data in a buffer (e.g., a first buffer).

Moreover, after determining the work importance for pieces of processing target data, an apparatus may distribute/assign the processing target data (model 1 to model M) to specific inference models (work 1 to work M) corresponding to specific tasks through a work distributor. For reference, the distribution may be achieved after the work importance is determined, but is not limited thereto. For example, the work importance may also be determined after inference results are determined.

Furthermore, if the inference results generated by specific inference models are stored in a buffer (e.g., a second buffer), some inference results, which include relatively predetermined work importance or which do not satisfy threshold work importance, may be removed from the second buffer.

Besides, if the inference results are reconstructed depending on a time stamp of the inference result, driving determination and vehicle control may be performed by an autonomous driving module (autonomous driving SW).

Figure 5:
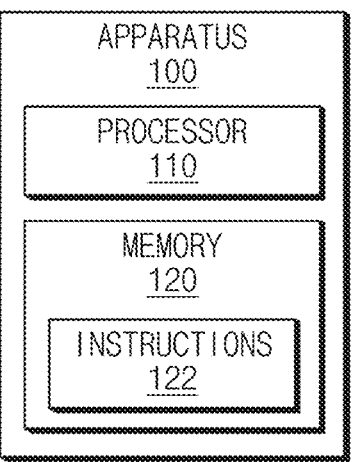
FIG. 5 is a block diagram showing an apparatus for controlling autonomous driving of an autonomous vehicle, according to an exemplary embodiment of the present disclosure.

FIG. 5 is a block diagram illustrating an apparatus for efficient inference, according to an exemplary embodiment of the present disclosure.

According to an exemplary embodiment of the present disclosure, an apparatus 100 or efficient inference may include a memory 120 for storing computer-executable instructions and at least one processor 110 for accessing the memory 120 to execute instructions 122.

In the instant case, the processor 110 may sequentially obtain pieces of processing target data for a specific task.

Moreover, the processor 110 may identify drop data excluding specific processing target data, which is input to at least one specific inference model corresponding to the specific task, from among the processing target data.

Furthermore, the processor 110 may be configured to generate a drop score for the drop data with reference to information corresponding to the drop data.

Besides, the processor 110 may be configured to determine whether to increase the number of specific inference models with reference to the drop score.

Furthermore, the processor 110 may be configured for controlling autonomous driving of an autonomous vehicle by adjusting the number of specific inference models based on the determining.

According to the method included in the present specification, driving and determination control may be performed efficiently according to priorities by minimizing data drops capable of being generated in the future by adaptively adjusting the number of inference models based on information related to past drop data, simultaneously reconstructing the inference results based on the work importance of the input data, and dropping some inference results. Moreover, the autonomous vehicle may be controlled to perform smooth autonomous driving based on the inference results for the specific task generated by a specific inference model of which the number is adjusted according to the method described above.

Figure 6:
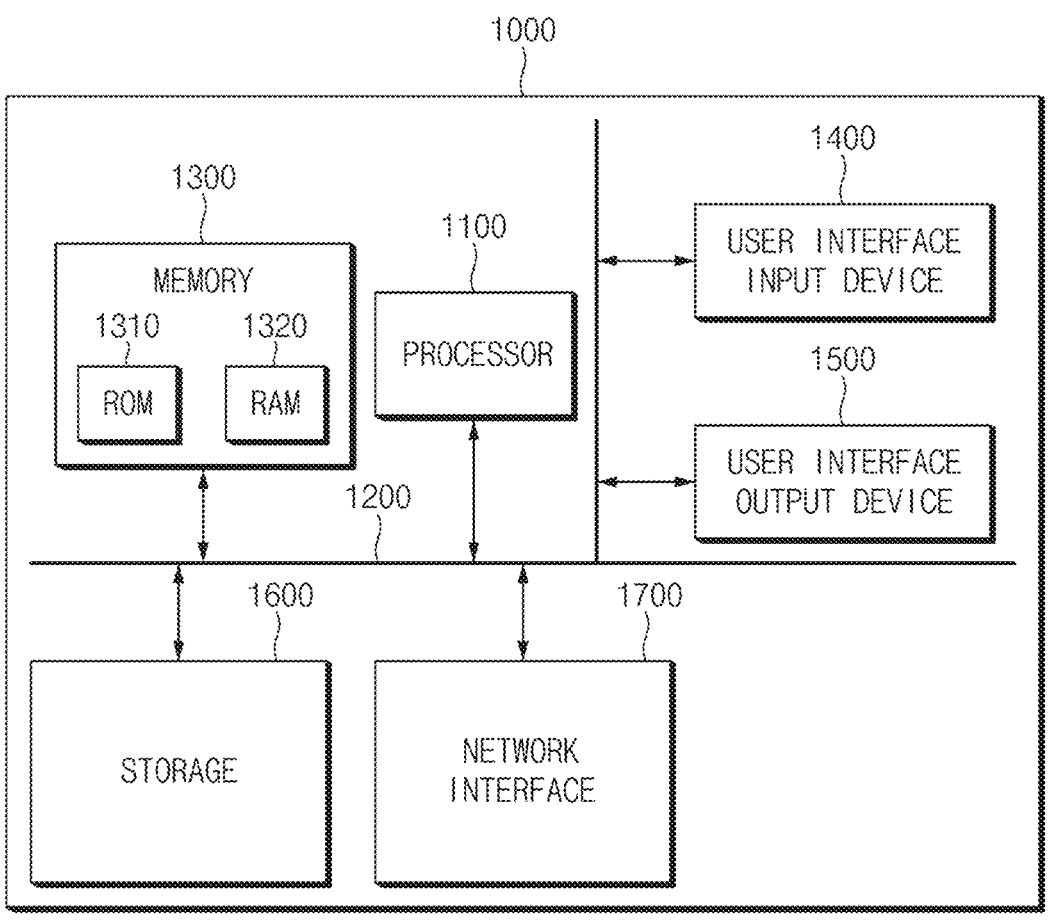
FIG. 6 is a diagram illustrating a computing system associated with a method for controlling autonomous driving of an autonomous vehicle or an apparatus using the same, according to an exemplary embodiment of the present disclosure.

FIG. 6 is a diagram illustrating a computing system associated with a method for controlling autonomous driving of an autonomous vehicle or an apparatus using the same, according to an exemplary embodiment of the present disclosure.

Referring to FIG. 6, a computing system 1000 may include at least one processor 1100, a memory 1300, a user interface input device 1400, a user interface output device 1500, storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read-Only Memory (ROM) 1310 and a Random Access Memory (RAM) 1320.

Accordingly, the processes of the method or algorithm described in relation to the exemplary embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor 1100 and the storage medium may reside in an application specific integrated circuit (ASIC). The ASIC may reside in a user terminal. In another method, the processor 1100 and the storage medium may reside in the user terminal as an individual component.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed based on the accompanying claims, and all the technical ideas within the scope equivalent to the claims should be included in the scope of the present disclosure.

The above description is merely an example of the technical idea of the present disclosure, and various modifications and modifications may be made by one skilled in the art without departing from the essential characteristic of the present disclosure.

The above-described embodiments may be implemented with hardware components, software components, and/or a combination of hardware components and software components. For example, the devices, methods, and components described in embodiments of the present disclosure may be implemented by use of general-use computers or special-purpose computers, such as a processor, a controller, an arithmetic logic unit (ALU), a digital signal processor, a microcomputer, a field programmable array (FPA), a programmable logic unit (PLU), a microprocessor, or any device which may execute instructions and respond. A processing device may perform an operating system (OS) or a software application running on the OS. Furthermore, the processing device may access, store, manipulate, process and generate data in response to execution of software. It will be understood by those skilled in the art that although a single processing device may be illustrated for convenience of understanding, the processing device may include a plurality of processing elements and/or a plurality of types of processing elements. For example, the processing device may include a plurality of processors or one processor and one controller. Also, the processing device may include a different processing configuration, such as a parallel processor.

Software may include computer programs, codes, instructions or one or more combinations thereof and configure a processing device to operate in a desired manner or independently or collectively control the processing device. Software and/or data may be permanently or temporarily embodied in any type of machine, components, physical equipment, virtual equipment, computer storage media or units or transmitted signal waves to be interpreted by the processing device or to provide instructions or data to the processing device. Software may be dispersed throughout computer systems connected over networks and be stored or executed in a dispersion manner. Software and data may be recorded in a computer-readable storage medium.

The methods according to the above-described embodiments may be recorded in a computer-readable medium including program instructions that are executable through various computer devices. The computer-readable medium may also include program instructions, data files, data structures, or a combination thereof. The program instructions recorded in the medium may be designed and configured specially for the exemplary embodiments of the present disclosure or may be known and available to those skilled in computer software. The computer-readable medium may include hardware devices, which are specially configured to store and execute program instructions, such as magnetic media (e.g., a hard disk, a floppy disk, or a magnetic tape), optical recording media (e.g., CD-ROM and DVD), magneto-optical media (e.g., a floptical disk), read only memories (ROMs), random access memories (RAMs), and flash memories. Examples of computer programs include not only machine language codes generated by a compiler, but also high-level language codes that are configured for being executed by a computer by use of an interpreter or the like.

The hardware device described above may be configured to act as one or more software modules to perform the operations of the above-described embodiments of the present disclosure, or vice versa.

Even though the exemplary embodiments are described with reference to restricted drawings, it may be obviously to one skilled in the art that the exemplary embodiments are variously changed or modified based on the above description. For example, adequate effects may be achieved even if the foregoing processes and methods are conducted in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

Accordingly, various exemplary embodiments of the present disclosure are intended not to limit but to explain the technical idea of the present disclosure, and the scope and spirit of the present disclosure is not limited by the above embodiments. The scope of protection of the present disclosure should be construed by the attached claims, and all equivalents thereof should be construed as being included within the scope of the present disclosure.

According to an exemplary embodiment of the present disclosure, it is possible to provide a method and an apparatus for controlling autonomous driving of an autonomous vehicle.

According to an exemplary embodiment of the present disclosure, it is possible to provide a method and an apparatus for flexibly adjusting the number of inference models with reference to information related to processing target data dropped from a buffer.

According to an exemplary embodiment of the present disclosure, it is possible to provide a method and an apparatus for utilizing a deep learning module with a long computation time even in an autonomous driving system that requires repeated determination at a short period.

According to an exemplary embodiment of the present disclosure, it is possible to provide a method and an apparatus for rapidly responding to rapidly changing driving situations.

According to an exemplary embodiment of the present disclosure, it is possible to provide a method and an apparatus for efficiently using resources of an autonomous driving system.

Besides, a variety of effects directly or indirectly understood through the present disclosure may be provided.

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method comprising:

obtaining, by at least one processor, pieces of processing target data for a specific task of an autonomous vehicle;

identifying, by the at least one processor, drop data excluding specific processing target data, which is input to at least one specific inference model corresponding to the specific task, from among the pieces of processing target data;

generating, by the at least one processor, a drop score for the drop data based on information corresponding to the drop data;

determining, by the at least one processor, whether to increase a number of the at least one specific inference model based on the drop score; and controlling, by the at least one processor, autonomous driving of the autonomous vehicle by adjusting the number of the at least one specific inference model based on the determining.

2. The method of claim 1, wherein the generating of the drop score includes:

generating the drop score for the drop data based on at least some of reliability information and drop elapsed time information, which correspond to the drop data.

3. The method of claim 2, wherein as the reliability information includes a great value, the drop score includes a great value, and as the drop elapsed time information includes a small value, the drop score includes a great value.

4. The method of claim 1, further including:

after the obtaining of the pieces of processing target data, assigning, by the at least one processor, at least some of the specific processing target data to an idle specific inference model among the at least one specific inference model;

relocating, by the at least one processor, specific inference data in response that the specific inference data, which is an inference result of the at least one specific inference model for the specific processing target data, is generated; and determining, by the at least one processor, whether to remove some of the specific inference data based on information corresponding to the specific inference data and information corresponding to a second buffer.

5. The method of claim 4, wherein the information corresponding to the specific inference data is generated based on at least some of object number information within a reference radius, reliability information, and time stamp information, which are included in the specific inference data.

6. The method of claim 1, wherein the determining of whether to increase the number of the at least one specific inference model includes:

determining whether to increase the at least one specific inference model based on a result of comparing a predetermined threshold score corresponding to the at least one specific inference model with the drop score, and available resource information.

7. The method of claim 1, further including:

after the determining of whether to increase the number of the at least one specific inference model, determining, by the at least one processor, whether to remove some of at least two specific inference models based on an idle time of each of the at least two specific inference models in a state that the at least one specific inference model includes the at least two specific inference models.

8. The method of claim 1, further including:

before the identifying of the drop data, sequentially storing, by the at least one processor, the pieces of processing target data in a first buffer; and removing, by the at least one processor, the drop data among the pieces of processing target data from the first buffer.

9. A non-transitory computer readable storage medium on which a program for performing the method of claim 1 is recorded.

10. An apparatus comprising:

a memory configured to store computer-executable instructions; and at least one processor operably connected to the memory and configured to execute the instructions by accessing the memory, wherein the at least one processor is configured to:

obtain pieces of processing target data for a specific task of an autonomous vehicle;

identify drop data excluding specific processing target data, which is input to at least one specific inference model corresponding to the specific task, from among the pieces of processing target data;

generate a drop score for the drop data based on information corresponding to the drop data;

determine whether to increase a number of the at least one specific inference model based on the drop score; and control autonomous driving of the autonomous vehicle by adjusting the number of the at least one specific inference model based on the determining.

11. The apparatus of claim 10, wherein the at least one processor is further configured to:

generate the drop score for the drop data based on at least some of reliability information and drop elapsed time information, which correspond to the drop data.

12. The apparatus of claim 11, wherein as the reliability information includes a great value, the drop score includes a great value, and as the drop elapsed time information includes a small value, the drop score includes a great value.

13. The apparatus of claim 10, wherein the at least one processor is further configured to:

assign at least some of the specific processing target data to an idle specific inference model among the at least one specific inference model;

relocate specific inference data in response that the specific inference data, which is an inference result of the at least one specific inference model for the specific
processing target data, is generated; and
determine whether to remove some of the specific infer-
ence data based on information corresponding to the
specific inference data and information corresponding
to a second buffer.

14. The apparatus of claim 13, wherein the information
corresponding to the specific inference data is generated
based on at least some of object number information within
a reference radius, reliability information, and time stamp
information, which are included in the specific inference
data.

15. The apparatus of claim 10, wherein the at least one
processor is further configured to:
determine whether to increase the at least one specific
inference model based on a result of comparing a
predetermined threshold score corresponding to the at
least one specific inference model with the drop score,
and available resource information.

16. The apparatus of claim 10, wherein the at least one processor is further configured to:
determine whether to remove some of at least two specific
inference models based on an idle time of each of the
at least two specific inference models in a state that the
at least one specific inference model includes the at least two specific inference models.

17. The apparatus of claim 10, wherein the at least one
processor is further configured to:
sequentially store the pieces of processing target data in a
first buffer; and
remove the drop data, which is some of the pieces of
processing target data, from the first buffer.

\* \* \* \* \*